INVENTORS.
TORALV BÅSEN &
FREDRIK CHRISTEN COLLIN
BY Eyre, Mann & Lucas
ATTORNEYS

INVENTORS.
TORALV BÅSEN &
FREDRIK CHRISTEN COLLIN
BY
ATTORNEYS

United States Patent Office 2,993,779
Patented July 25, 1961

2,993,779
PROCESS OF REDUCING METAL OXIDES
Toralv Båsen, Vagsbygd, near Kristianssand, and Fredrik Christen Collin, Ljan, Oslo, Norway, assignors to Elektrokemisk A/S, Oslo, Norway, a corporation of Norway
Filed Mar. 25, 1959, Ser. No. 801,963
Claims priority, application Norway Jan. 22, 1958
9 Claims. (Cl. 75—36)

The present invention relates to a smelting process of the type in which metal oxide ores in the form of porous molded bodies such as briquettes or pellets and the like are charged into a smelting furnace and reduced to base metal or carbide such as calcium carbide.

As is known metal oxide ores when fine grained can only be reduced with difficulty in ordinary smelting furnaces and the practice is to mold the fine grained ore into the form of an agglomerate that includes carbonaceous material and when necessary a suitable binder. In smelting such porous molded bodies many advantages are realized by preheating the charge and foremost among these is a reduction in power consumption and increase in capacity of the furnace. In order to have truly effective preheating it is necessary to have partial reduction of the ore before it is charged to the smelting furnace.

Suggestions have previously been made to carry out the preheating operation in rotary kilns and muffle furnaces but these have not proven satisfactory. In the case of muffle furnaces heat is transferred so slowly that the process is ineffective for commercial operations and the large dimensions of rotary kilns result in a considerable loss of heat which makes them inefficient. Rotary kilns are also expensive to install and operate and they have not been successfully used in commercial installations. Vertical shaft furnaces are better since the heat loss in the furnace is low and as compared to rotary kilns a shaft type furnace is inexpensive to install and operate. But the shaft furnaces have a serious drawback.

The shaft of the furnace is protected by suitable refractory material and the molded charge bodies sink slowly down through the shaft. Combustible fuel and air are charged into the bottom of the furnace and the hot gaseous products of combustion pass upwardly in counter current flow relative to the charge. Under present methods of operation when the temperature is raised high enough to get a partial reduction comparable so that obtained in a rotary kiln the charge overheats in certain areas of the shaft to cause sintering and hanging. If this occurs the sintered material must be broken down and this is a difficult job that seriously interferes with production. As frequently happens the sintering becomes severe and the furnace must be shut down and cleaned out. On the other hand when temperatures are maintained low enough to avoid the detriment of sintering any reduction that may occur is insignificant and the operation is inefficient.

In accordance with the present invention a new and novel method of operating a vertical shaft furnace has been devised which makes it possible to achieve effective partial reduction of the molded charge bodies without overheating, sintering and hanging of the charge. In the shaft furnace many varied and complicated reactions take place and among these we have found that there are two of primary importance. The first involves the partial reduction reaction in which carbonaceous material in the porous molded body reacts with the metal oxide and any one or all of the following may occur. The metal oxide may be reduced without melting down the molded body. The metal oxide may be reduced to form an oxide of lower valence or partial reduction to base metal or metal carbide may take place. In all cases the reaction is accompanied by the evolution of reaction gas which is itself combustible. The term partial reduction as used herein is intended to include any and/or all of these reduction reactions with accompanying evolution of reaction gas.

The second reaction involves the combination of the oxygen of combustion air with the carbonaceous material of the porous molded body. It has been found that under the conditions that exist in the shaft furnace carbonaceous material particularly that in the unprotected surface layer of the molded body will readily combine with oxygen in combustion air and this reaction takes place in the shaft furnace at the same time that the partial reduction reaction is being carried out. Any carbonaceous material that combines with combustion air is not available for reduction of metal oxide and if this reaction goes on for any extended period of time the charge to the smelting furnace will be deficient in carbon for reduction purposes.

It has now been discovered that when these reactions are properly controlled and balanced one against the other it is possible to inject combustion air into the charge under controlled conditions to initiate, maintain or accelerate the partial reduction reaction without loss of carbonaceous material to combustion air and without overheating, sintering and hanging of the charge. Since the metal oxide and carbonaceous material are present in the porous molded bodies in the form of small grains a large reactive contact surface is provided and because of this it is an established fact that when the temperature of the body reaches a certain level the partial reduction reaction is sharply accelerated to give an extremely rapid reduction. It has been discovered that when this rapid reduction occurs the reaction gases are generated so rapidly that the outwardly flowing gas will envelop the porous molded body to form a protective shield which is effective to prevent oxygen in the combustion air from combining with the carbonaceous material in the molded charge body. It is this balance between the two reactions that take place in the shaft furnace during partial reduction that makes possible the injection of combustion air so that partial reduction may be carried out while the charge is being preheated in the shaft furnace.

The necessary control to maintain proper balance and avoid sintering and hanging of the charge is achieved by judicious introduction of air into the charge. To this end combustion air is injected into the charge in a plurality of spaced zones and within its zone the air will cause rapid combustion and generate heat to accelerate the partial reduction reaction. If combustion air were to be continuously injected into any one area of the charge as it sinks slowly down in the shaft the rapid reduction would very soon result in overheating with resulting sintering and hanging of the charge. As is known the partial reduction reaction is endothermic and a continuous supply of heat is required in order to maintain the reaction and as a result the necessary control for balancing the reactions to avoid overheating, sintering and hanging of the charge is achieved by positioning a cooling zone in the space between each zone of rapid combustion which is either void of combustion air or so little air is present that the endothermic cooling effect of the reaction will predominate over generation of heat and the temperature of the charge will drop. In operation the process gives excellent control of the reduction reactions and successful pilot-plant installations have been in operation.

As to conditions of operation, the composition of the porous molded charge bodies, the rate of flow of charge through the furnace and other details of operation may be the same as in a conventional shaft furnace in which no air is injected into the charge as it moves down through the furnace. The manner of determining all of these operational details is known in the art and as is known the source of the ore, the way in which it is prepared for the smelting operation and the particular design of the shaft and smelting furnaces all have a major bearing on the exact conditions of operation so that no one set of conditions may be prescribed for universal application.

Insofar as the present invention is concerned an experienced furnace operator will be able to tell from his control instruments the exact temperature level that will be required in the shaft furnace in order to provide the rapid reduction for generating the required reaction gas for balancing the reactions in the shaft furnace. The same is true of overheating, sintering and detrimental hanging of the charge.

Further details, advantages and ways in which the process of the present invention may be carried out may best be understood by reference to the accompanying drawings which illustrate suitable forms of apparatus for carrying out the process. In the drawings.

Figure 1:
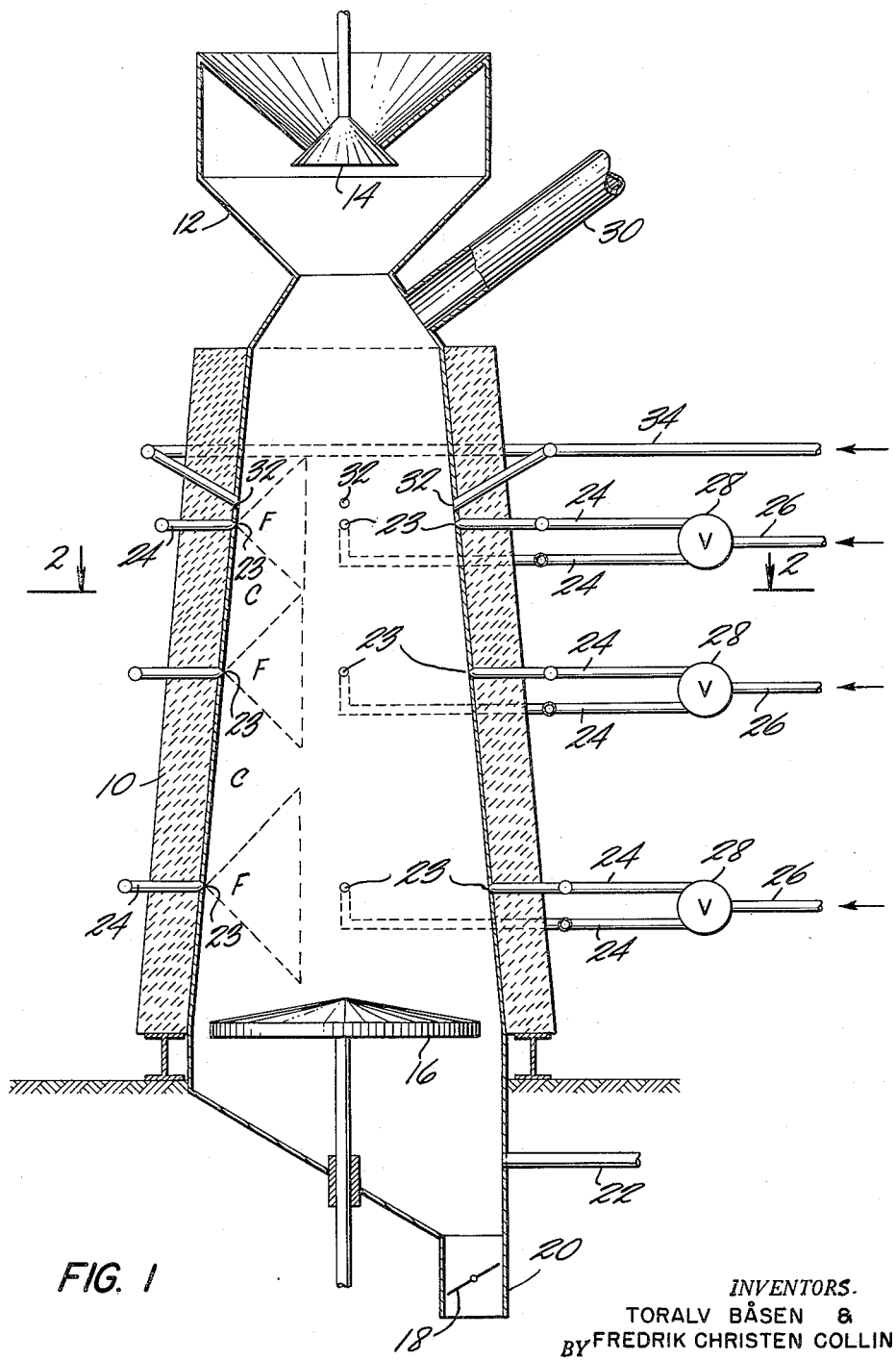
FIG. 1 is a vertical section taken through a suitable form of shaft furnace for carrying out the process of the present invention.

Turning now to the drawings, 10 is a vertical shaft furnace preferably made conical and lined with a suitable refractory material. The charge is fed through hopper 12 and the rate is controlled by means of a suitable valve arrangement 14. A conventional type of rotating discharge table 16 assists in discharging the porous molded bodies through a valve 18 into the discharge pipe 20. Operation of the process may be continuous and pipe 20 may be arranged to discharge directly into an electric smelting furnace not shown. In such case combustible gas from the reduction in the smelting furnace may be fed into the bottom of shaft furnace 10 by means of pipe 22. Otherwise a conventional fuel for preheating the charge in a shaft furnace may be introduced into the bottom of the furnace through pipe 22.

Figure 2:
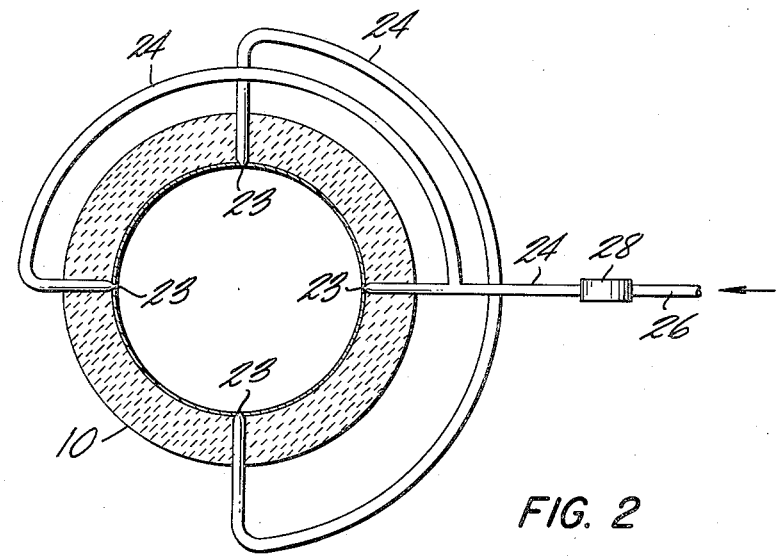
FIG. 2 is a section view of the furnace of FIG. 1 taken on line 2—2 of FIG. 1.

Injection air under pressure is supplied by means of a plurality of pipes 24 and these pipes may be arranged at random throughout the body of the shaft furnace or as shown in the drawings the pipes may be arranged at three different levels. Air may of course be injected at more than three different levels if desired. Best results in controlling the reaction are achieved by uniformly mixing the air with the combustible fuel throughout the volume of a cross sectional area in the furnace and for this purpose it is preferred to position each of four air nozzles 23 in the shaft wall at 90° intervals at each of the three levels (see FIG. 2). A convenient arrangement of the air pipes 24 is illustrated in FIGS. 1 and 2. As there shown pipes 24 receive air from a single supply line 26 and a two way valve 28 is positioned in the line so that air may be introduced into the shaft by alternating use of two pairs of diametrically opposed nozzles. The drawings show a furnace arrangement in which the nozzles at each level are positioned directly above each other in a vertical line. If desired the nozzles at the different levels may be displaced in relation to the nozzles of other levels. Exhaust gases are led out of the shaft through the outlet pipe 30. If desired additional fuel may be introduced into the shaft and the fuel nozzles may be placed at one or more different levels or even at random in the shell of the furnace. One such arrangement is illustrated in FIG. 1 where the fuel is supplied by nozzles 32 and pipe 34. The fuel pipes and nozzles are arranged in a manner corresponding to that of the air supply pipes and nozzles and if desired a two way valve not shown may be used in the fuel supply line 34.

In operating the shaft of FIG. 1 there may be a tendency for local overheating and sintering of the charge in the area immediately surrounding the nozzles which is the hottest part of the furnace. If sintering is severe it may interfere with control of the operation and cause wear of the refractory walls. This condition may be overcome by rotating or oscillating the shaft of the furnace relative to the stationary charge. Any suitable apparatus for rotating or oscillating the shaft of the furnace may be employed and since such apparatus is conventional it is not shown in the drawing. When four nozzles are used on each level as shown in FIG. 1 the shaft need only be oscillated through an angle of 90°. In this way the whole charge will gradually come in contact with the rapidly burning gases and any tendency for local overheating in the immediate area of the nozzles and subsequent sintering and disturbances in the operation may be avoided. If the shaft rotates discharge is effected by rotating or oscillating discharge table 16 in a corresponding way but in opposite direction. On the other hand a stationary discharge table may be employed and control of the discharge from the furnace may be achieved by altering the speed of revolution of the shaft.

Figure 3:
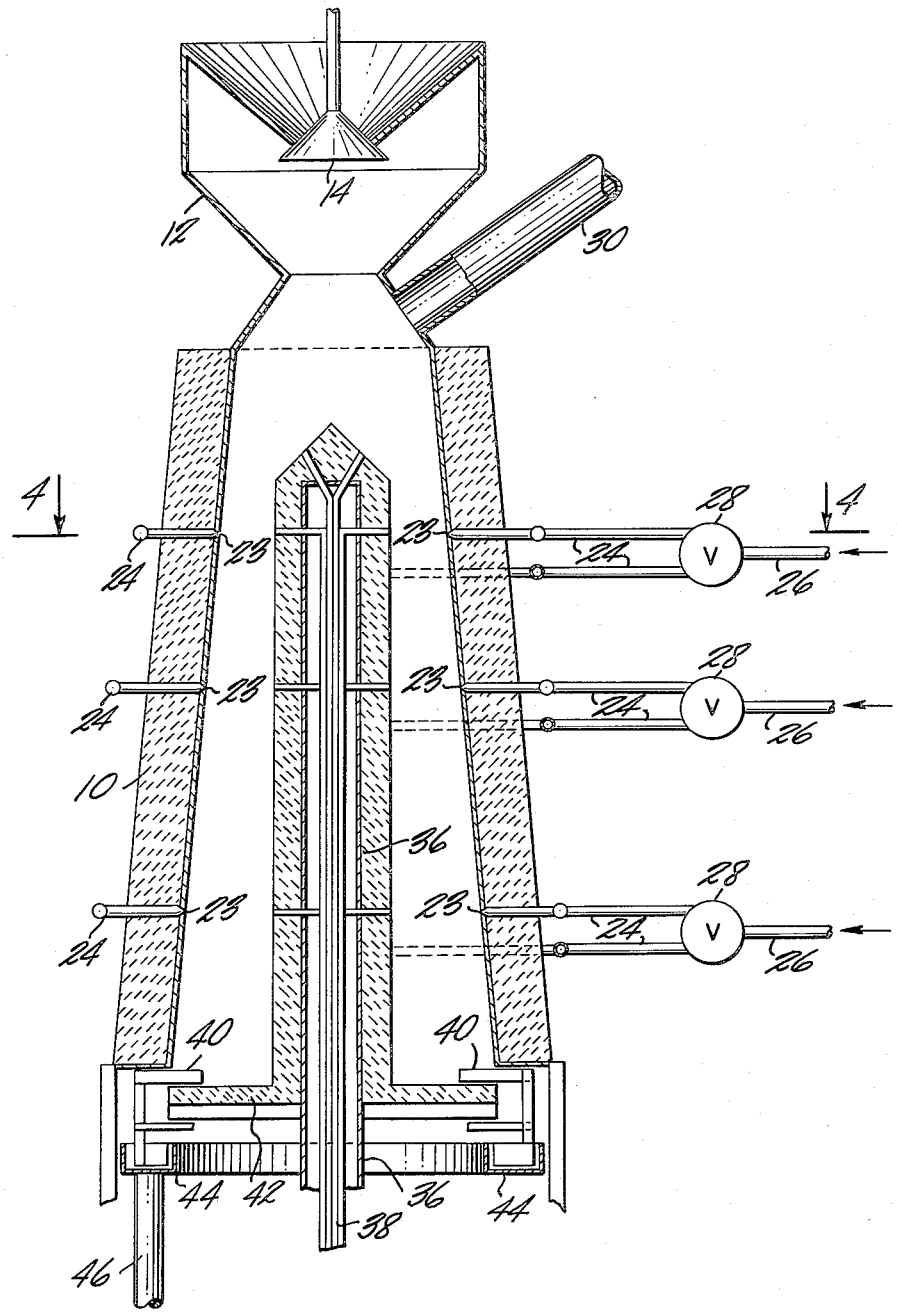
FIG. 3 is a vertical section through another suitable form of shaft furnace for use in carrying out the process of the present invention.

In FIG. 3 a modified form of shaft furnace suitable for use in carrying out the present process is shown in which combustion air is injected into the charge through the shell of the furnace as well as outwardly from the center of the charge. The shell of the furnace may be identical with that of the furnace shown in FIG. 1 and corresponding numerals are employed to indicate identical parts.

Figure 4:
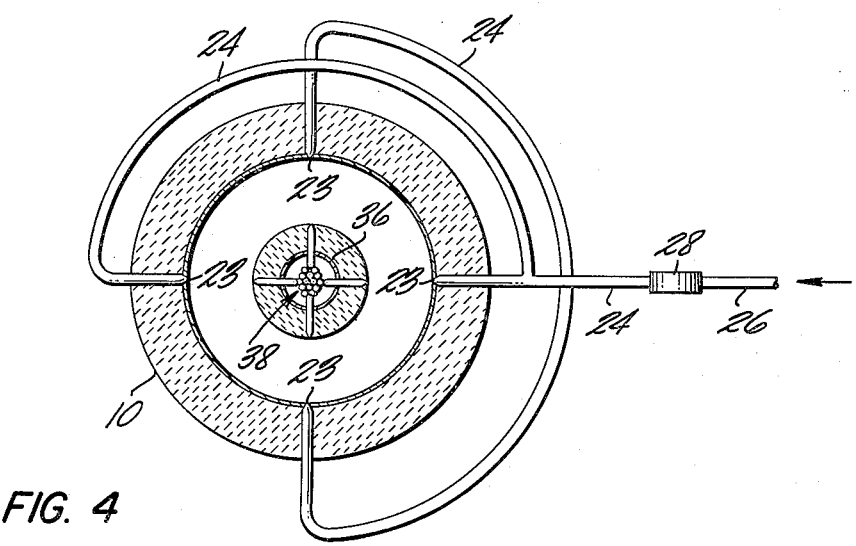
FIG. 4 is a section through the furnace of FIG. 3 taken on line 4—4 of FIG. 3.

In the case of the furnace shown in FIG. 3 the shaft is provided with a central air injection pipe 36 which may be made of a heat resistant alloy or coated with a ceramic material with a high softening point. The pipe 36 is provided with a plurality of nozzles which are positioned at different levels for air injection and as best shown in FIG. 4, four nozzles are preferably employed at each level. Each nozzle is positioned at 90° intervals in the surface of the pipe to provide two nozzle pairs at each level. There are four different levels for air injection and the nozzles at three of the levels are placed opposite corresponding nozzles in the shaft wall and on the same diameter as these. If desired the center pipe may be turned so that these nozzles will be displaced 45° in relation to the nozzles in the shaft wall. The center pipe 36 may be so arranged that it can be turned or oscillated through an angle of 90°. One convenient way of supplying air to the nozzles is to provide a plurality of pipes 38 each of which leads up within the pipe 36 to one of the nozzles. In this way it will be possible to control and adjust the amount of air passing through each individual nozzle. If desired the air to the nozzles at the different levels may be supplied through a two way valve in similar manner to that employed for the nozzles in the shell of the furnace so that the shell and center nozzles may be worked in pairs in cooperative or opposing relationship.

The reduced agglomerates are removed from the shaft by means of a pair of scraper blades 40 which scrape the agglomerates from the circular plate 42 and drops them into an annular duct 44. The agglomerates are discharged from the duct through one or more pipes 46 at the bottom of the annular duct. The mechanism for rotating the scraper blades is not shown as any suitable conventional apparatus may be employed for this purpose.

Figure 5:
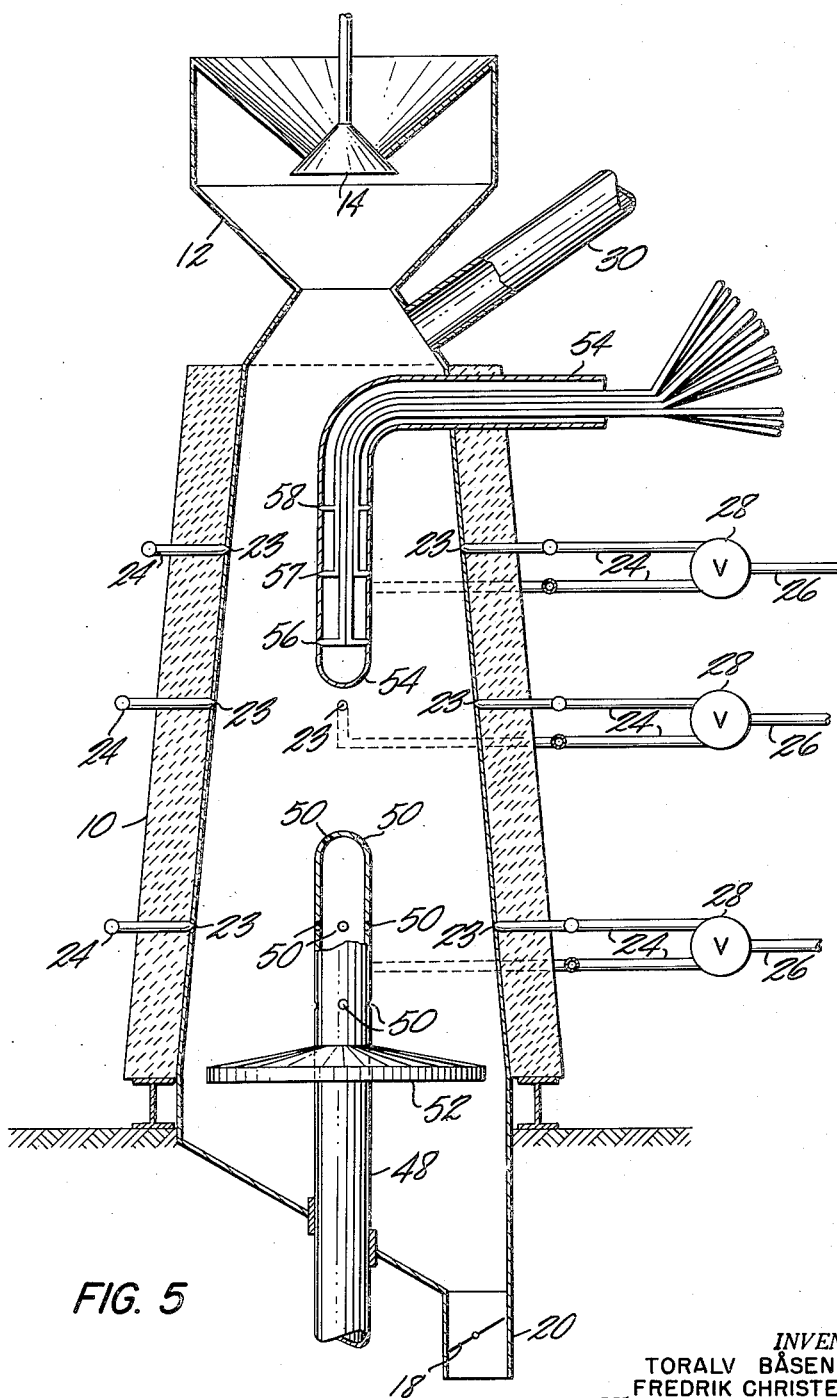
FIG. 5 is a vertical section through still another form of suitable shaft furnace for carrying out the process of the present invention.

If desired the air injected into the center of the charge may be fed in from the top of the shaft of the furnace as well as from the bottom by means of two separate pipes. Such an arrangement is illustrated in FIG. 5. As in the case of the form of structure shown in FIG. 3 the shell of this furnace and the arrangement of the air injection pipes in the shell is the same as that illustrated in FIG. 1. The center pipe 48 which leads up into the center of the charge from the bottom of the furnace does not have separate nozzles but the pipe is provided with openings or perforations 50 placed at suitable intervals along its length and around its circumference. Pipe 48 carries a rotating discharge table 52 that may revolve with the pipe for discharge of the reduced agglomerates in a similar manner to that described in connection with FIG. 1. The apparatus for rotating the pipe 48 is not shown and any suitable type of apparatus may be employed for this purpose.

The center pipe 54 which leads down into the center of the charge from the top of the shaft furnace is provided with a plurality of air injection nozzles preferably arranged in pairs with separate air supply as described in connection with the central pipe shown in FIG. 3. In the figure the nozzle pairs are position at three different levels marked 56, 57 and 58.

Best results for control of the preheating and partial reduction process are achieved by intermittent injection of air through the nozzles in the side wall and central part of the furnace. The air is preferably injected on a periodic time cycle by connecting and disconnecting the air supply. Excellent results have been obtained by systematically alternating the air injection between adjacent nozzles at one half minute intervals and by utilizing pairs of nozzles that are diametrically opposed.

The operation of our process may readily be understood from the following illustrative example.

Briquettes with magnetic concentrate were made up to include about 68% by weight of ore containing 65% Fe as $Fe_3O_4$, about 11% by weight of limestone and about 14% by weight of $+\frac{1}{8}''$ coke particles and about 3% by weight of a sulphite cellulose black liquor pitch as binder. The briquettes were made up in conventional manner on a roller press. They were of egg-shape with dimensions 2.4 x 1.8 x 1.3 inches. The final briquettes had a density of about 2.5 g./cm.$^3$. The briquettes were tested for reduction and it was found that the required rapid reduction took place at a temperature of about 900° C.

The shaft furnace employed for preheating and partial reduction was that shown in FIG. 1 of the drawings. The shaft of the furnace was 80 inches high. The diameter at the top was 13 inches and at the bottom it was 21 inches. The briquettes were fed into the shaft of the furnace at the rate of about 600 lbs. per hour and the reaction gases from the electric smelting furnace in which final reduction was carried out were fed into the furnace through pipe 22. The velocity of the combustible reaction gas from the electric furnace was about 30 cubic feet per minute and the gas had a heat value of 250 B.t.u.'s per cubic foot. In carrying out the preheating and partial reduction of the briquettes the temperature in the shaft was maintained between about 950° C. to about 1100° C. and there was no detrimental sintering and hanging of the charge. At the top temperature level some minor sintering occurred but the sintering was not so severe that it interfered with production. Within the temperature range specified it was found that the linear speed of the reaction gases through the surface layer of the briquettes was not below $\frac{1}{4}''$ per minute calculated at 0° C. and 760 mm. of Hg and there was no evidence of a deficiency of reduction carbon in the electric smelting furnace showing that the briquettes had been enveloped with a protective shield of reaction gas which prevented the oxygen in combustion air from combining with the carbon particles in the briquettes. In the smelting furnace the final reduction of the iron ore took place with a power consumption of about 1250 kwh. per ton of pig iron representing a saving of about 850 kwh. per ton over that employed by smelting the same concentrate in the conventional way without partial reduction in an electric smelting furnace.

The temperature in the furnace was controlled by the intermittent injection of air supplied at a linear velocity of about 150 feet per second and the necessary control was achieved by systematically alternating the air injection between adjacent nozzles at each level at intervals of about one half minute.

The furnace was equipped with thermocouples strategically placed throughout the body of the charge and as shown by the recorded temperatures in the fast burning zones of air injection (marked F in FIG. 1), the reaction temperature very quickly reached the top limit of 1100° C. In the cooling zones (marked C in FIG. 1) the endothermic characteristics of the reaction resulted in cooling and the temperature of the charge dropped down to about 950° C. Local overheating in the burning zones was readily taken care of by cutting down on air injection and where the temperature got below 950° C. in a cooling zone this was remedied by increasing the injection of air in the fast burning zone immediately above such cooling zone.

The furnace was then provided with the center heating pipe 36 shown in FIG. 3 and in subsequent operations it was found that this provided extremely delicate control and smooth operation.

In subsequent runs under varied operating conditions we found that the linear speed of the reaction gases through the surface layer of the briquettes preferably should be at least $\frac{1}{4}''$ per minute calculated at 0° C. and 700 mm. Hg in order to envelop the briquettes with a protective shield of reaction gas to prevent oxygen of combustion air from combining with the carbon particles of the briquettes. Best results were achieved when the linear speed of reaction gases through the surface layer of the briquettes was maintained above about $1''$ per minute. The temperature of the charge of the briquetted iron oxide ores was maintained within the range of about 900° C. to about 1100° C.

It is also to be understood that while the foregoing example specifically describes the operation carried out with magnetite, the same operation can be carried out in the same type of apparatus by forming briquettes of other types of ores such as ilmenite, manganese, and chromium ores. These ores are briquetted in the usual manner and are charged to the same type of furnace as we have previously described and a linear speed of the reaction gases through the surface layer of the briquettes is maintained at at least 0.5 centimeter per minute calculated at 0° C. and 760 mm. of Hg. In the case of the ilmenite ore the temperature of the charge was maintained between about 950° C. and 1150° C. Where manganese briquettes were used the temperature was maintained between about 900° C. and 1050° C. and in the case of chromium the temperature of the briquettes was between about 950° C. and 1100° C. The other details were substantially as described above.

While the process of the present invention is especially directed to the preheating and partial reduction of molded bodies that contain metal oxide and a reducing agent in a shaft furnace without melting down the molded bodies so that they may be subsequently charged to a smelting furnace as agglomerates for final reduction, it will be understood by those skilled in the art that the disclosed principles of operation may be employed for complete reduction of the metal oxide of the molded bodies in the shaft furnace.

It will also be understood that it is intended to cover all changes and modifications of the preferred form of invention herein chosen for the purpose of illustration which do not constitute departures from the spirit and scope of the invention.

This application is a continuation-in-part of applicants' earlier application, Serial No. 787,961, filed January 20, 1959, now abandoned.

What we claim is:

1. In a reducing process of the type in which metal ore in the form of porous molded bodies that include a metal oxide selected from the group comprising iron ore, manganese ore and chromium ore and carbonaceous material is charged into a shaft furnace for preheating and reduction of the charge without melting down the porous molded bodies, the method which comprises the steps of feeding the porous molded charge bodies into the furnace in counter current flow to combustible fuel to preheat the charge, injecting air under positive pressure into the charge in a plurality of zones, spacing each of said zones a predetermined distance apart to establish cooling zones positioned adjacent each of said fast combustion zones in which the endothermic character of the charge will predominate over the heat generated by combustion of fuel to cool the charge, adjusting the amount of air injected into the fast combustion zones to the point where sufficient air is introduced to cause combustion to take place to raise the temperature of the charged bodies in such zones and initiate a rapid partial reduction reaction which generates reaction gas in the charge body enveloping it with a protective shield that prevents oxygen in the air from combining with carbonaceous material in the porous molded bodies and from time to time adjusting the amount of air injected into the fast combustion zones so that the amount of air introduced is brought to a low enough level to reduce combustion in the cooling zones to cool the charge and prevent detrimental overheating, sintering and hanging.

2. In the process of reducing metal ores in a shaft furnace with a charge containing porous molded bodies that include a metal oxide ore selected from the group comprising iron ore, manganese ore and chromium ore and carbonaceous material for reduction of metal oxide, the process which comprises the steps of generating reduction reaction gases in the porous molded bodies that envelop the bodies to provide a protective shield against oxygen of combustion air by means of injecting combustion air into the charge of the furnace to establish a fast combustion zone, adjusting the injection of such air to the point at which a cooling zone will be formed adjacent the fast combustion zone in which cooling zone the endothermic characteristics of the reduction reaction predominate over the heat generated in such cooling zone to cool the porous molded bodies whereby preheating and reduction of the bodies may take place without detrimental overheating, sintering and hanging of the charge.

3. The method specified in claim 2 which includes the step of feeding the discharged porous molded bodies from the shaft furnace directly into an electric smelting furnace for final reduction.

4. The method specified in claim 3 which includes the step of supplying reduction reaction gases from the electric smelting furnace to the shaft furnace for generating heat therein.

5. The process of reducing metal ores in a shaft furnace which comprises the steps of introducing aggregates comprising finely divided metallic oxides selected from the group comprising iron ore, manganese ore and chromium ore and carbonaceous reducing agent into the upper part of a shaft furnace and introducing a gaseous fuel into the bottom part of such shaft, injecting air into a limited heating zone in the upper part of the shaft to generate localized heat, adjusting the amount of air so injected to such a level that the charge when entering such a zone is heated rapidly to a temperature of around 1100° C. to initiate reduction and cause reaction gases to flow out from the aggregates and protect the carbonaceous ingredient of the aggregates from the direct action of oxygen of the air and to supply heat of reaction to carry on reduction after that portion of the charge leaves such localized heating zone, injecting additional air into a lower heating zone again to generate localized heat and adjusting the amount of air so injected that there is sufficient air so that before the temperature of the previously preheated portion of the charge drops below about 950° C. it is again reheated to around 1100° C. so that further reduction is initiated before that portion of the charge again moves out of such heating zone, and continuing such alternate heating and cooling until the charge reaches the bottom of the furnace, whereby the charge is maintained in a temperature range of between about 950° C. and 1100° C. while the charge is at all times substantially protected against the direct action of oxygen on its carbonaceous component.

6. A method as specified in claim 5 in which the metallic oxide is iron oxide.

7. A method as specified in claim 5 in which part of the air injected into the charge is injected into the central portion of the charge while other portions are being injected into the peripheral portion of the charge.

8. A method as specified in claim 5 in which a portion of the shaft furnace is given a rotary motion relative to the charge during the operation.

9. A method as specified in claim 5 in which the air injected into the charge is injected intermittently.

References Cited in the file of this patent

UNITED STATES PATENTS

| | | |
|---|---|---|
| 116,558 | Cochrane | July 4, 1871 |
| 507,073 | Kitson et al. | Oct. 17, 1893 |
| 1,449,834 | Pehrson | Mar. 27, 1923 |
| 1,610,819 | Steenstrup | Dec. 14, 1926 |
| 1,777,993 | Coley | Oct. 7, 1930 |
| 1,871,848 | Gustafsson | Aug. 16, 1932 |
| 2,166,207 | Clark | July 18, 1939 |
| 2,593,257 | Bradley et al. | Apr. 15, 1952 |
| 2,829,042 | Moklebust | Apr. 1, 1958 |